United States Patent

Kuriyama et al.

[11] Patent Number: 5,906,932
[45] Date of Patent: May 25, 1999

[54] PROCESS FOR SOIL REMEDIATION AND APPARATUS USED THEREFOR

[75] Inventors: Akira Kuriyama; Etsuko Sugawa, both of Atsugi; Yoshiyuki Touge, Sagamihara; Masahiro Kawaguchi, Atsugi; Masatoshi Iio, Funabashi; Yuri Senshu, Kashiwa; Akira Watanabe, Kanagawa-ken, all of Japan

[73] Assignee: Canon Kabushiki Kaisha & Raito Kogyo Co., Ltd., Tokyo, Japan

[21] Appl. No.: 08/831,695

[22] Filed: Apr. 10, 1997

[30] Foreign Application Priority Data

Apr. 12, 1996 [JP] Japan ................................ 8-91487
Apr. 12, 1996 [JP] Japan ................................ 8-91492

[51] Int. Cl.$^6$ .................................................. B09B 3/00
[52] U.S. Cl. ................ 435/262.5; 405/128; 435/266; 435/289.1; 435/309.1; 210/605
[58] Field of Search ................... 210/605, 610, 210/747, 620, 170, 251, 908; 435/262, 264, 262.5, 243, 244, 248, 250, 289.1, 304.1, 821, 266, 309.1; 405/128; 166/246

[56] References Cited

U.S. PATENT DOCUMENTS

| | | | |
|---|---|---|---|
| 4,057,046 | 11/1977 | Kawaguchi | 601/150 |
| 4,877,736 | 10/1989 | Fliermans | 435/183 |
| 4,925,802 | 5/1990 | Nelson et al. | 435/262 |
| 4,992,174 | 2/1991 | Caplan et al. | 210/610 |
| 5,006,250 | 4/1991 | Roberts et al. | 210/610 |
| 5,017,289 | 5/1991 | Ely et al. | 210/610 |
| 5,080,782 | 1/1992 | Caplan et al. | 210/170 |
| 5,134,078 | 7/1992 | Sieksmeyer et al. | 435/262 |
| 5,171,104 | 12/1992 | Bernhardt | 405/128 |
| 5,334,533 | 8/1994 | Colasito et al. | 435/264 |
| 5,384,048 | 1/1995 | Hazen et al. | 210/610 |
| 5,472,294 | 12/1995 | Billings et al. | 405/128 |
| 5,560,737 | 10/1996 | Schuring et al. | 210/747 |
| 5,575,998 | 11/1996 | Nemec et al. | 424/93.3 |
| 5,577,558 | 11/1996 | Abdul et al. | 166/246 |
| 5,614,410 | 3/1997 | Mueller et al. | 210/610 |

FOREIGN PATENT DOCUMENTS

| | | |
|---|---|---|
| 4335574 | 3/1995 | Germany . |
| 2-92274 | 4/1990 | Japan . |
| 2-273599 | 11/1990 | Japan . |
| 3-292970 | 12/1991 | Japan . |
| 6-70753 | 3/1994 | Japan . |
| 6-227769 | 8/1994 | Japan . |
| 6-254537 | 9/1994 | Japan . |
| 7-112176 | 5/1995 | Japan . |
| 7-185252 | 7/1995 | Japan . |
| 95-08513 | 3/1995 | WIPO . |

OTHER PUBLICATIONS

Nakajima et al., "Novel Metabolite of Trichlorethylene . . . Pathway", Biosci. Biotech. Biochem. 53, (3) 486–489 (1992).

Uchiyama, et al., "Aerobic Degradation of Trichloroethylene . . . Strain M", Agric. & Biolog. Chem., 53, (11), 2903–2907 (1989).

Negoro, et al., Growth of Microalgae . . . $NO_x$, Appl. Biochem. & Biotech., 28/29 12th Symp. Biotech, 877–886 (1991).

Beam, et al., "Microbial Degradation of . . . Commensalism", J. Gen. Microbiol., 82, 163–169 (1974).

(List continued on next page.)

*Primary Examiner*—Jay H. Woo
*Assistant Examiner*—Fred Prince
*Attorney, Agent, or Firm*—Fitzpatrick, Cella, Harper & Scinto

[57] ABSTRACT

A soil remedying process for the soil contaminated with a volatile pollutant, which comprises the steps of forming in a probe a remediation site containing a microorganism which can degrade the volatile pollutant, introducing the volatile pollutant into the remediation site in the probe, and degrading the volatile pollutant by the microorganism.

14 Claims, 7 Drawing Sheets

OTHER PUBLICATIONS

Embley, et al., "Lactobacillus . . . The Human Vagina", Int. J. System Bact., 39 (3) 368–370 (1989).

Vannelli, et al., "Degradation of Halogenated . . . *europaea,*" Appl. & Environ. Microbiol., 56, (4), 1169–1171 (1990).

Tsien, et al., Biodegradation of Trichloroethylene . . . OB3b, Appl. & Environ. Microbiol., 55 (12), 3155–3161 (1989).

Harker, et al., "Trichloroethylene Degradation . . . JMP134", Appl. & Environ., Microbiol., 56 (4) 1179–1181 (1990).

Henry, et al., Influence of Endogenous . . . a Groundwater Aquifer, Appl. & Environ. Microbiol., 57 (1) 236–244 (1991).

Patent Abstracts of Japan, 95, 8, 9/95 for JP 07–112176.

Patent Abstracts of Japan, 18, 651 (C–1285) 12/94 for JP 06–254537.

Hanson, et al; "Development of Methanotrophs . . . Olefins", A.C.S. Nat'l Mtg. Div. Env. Chem. 29, 365–366 (1989).

Ewers, et al; "Selection of trichloroethane . . . by TCE", Arch. Microbiol., 154, 410–413 (1990).

J. Japan Sewage Works Assn., 24, 273, 27–33 (1987).

Winter, et al: "Efficient Degradation . . . *Escherichia Coli",* Bio/Techn., 7, 282–285 (1989).

Wackett, et al; "Degradation of Trichloroethyleme . . . *putida* F1", Appl. & Environ. Microb. 54, 7, 1703–1708 (1988).

Vandenbergh, et al; "Metabolism of Volatile . . . *fluorescens",* Appl. & Environ. Microb. 54, 10, 2578–2579 (1988).

Nelson, et al; "Biodegradation of Trichloroethylene . . . Pathway", Appl. & Environ. Microb., 53, 5, 949–954 (1987).

Little, et al; "Trichloroethylene Biodegradation . . . Bacterium", Appl. & Environ. Microb., 54, 4, 951–956 (1988).

Folom, et al; "Phenol and Trichloroethylene . . . Substrates", Appl. & Environ. Microb., 56, 5, 1279–1285 (1990).

Shields, et al; "Mutants of Pseudomonas . . . Tricholorethylene", Appl. & Environ. Microb., 57, 7, 1935–1941 (1991).

Nelson, et al; "Aerobic Metabolism of . . . . Bacterial Isolate", Appl. & Environ.Microb., 52, 2, 383–384 (1986).

PROCESS FOR SOIL REMEDIATION AND APPARATUS USED THEREFOR

BACKGROUND OF THE INVENTION

1. Field of the Invention

The present invention relates to a process for remedying a soil contaminated with a pollutant and an apparatus used therefor.

2. Related Background Art

A large amount of chemical compounds or chemical products have been produced with the recent rapid progress in technology and science. Many of these are slowly accumulated in the environment and contaminate the environment. In particular, land where humans live is most easily affected by artificial contamination, and since the environmental water is circulating among the land, hydrosphere, and atmosphere, the environmental pollution of the land is a serious problem which might be expanded to the global level. Well-known examples of soil (land) contaminants include organochloric compounds such as trichloroethylene (TCE), tetrachloroethylene (PCE) and dioxin, aromatic compounds such as toluene, xylene and benzene, and fuel such as gasoline. Organochloric compounds such as trichloroethylene and tetrachloroethylene were once extensively used for washing precision parts as well as for dry cleaning, and contamination of soil and underground water on a large scale due to the leakage of the organochloric compounds are now being revealed. Since such organochloric chemicals are teratogenic and carcinogenic and adversely affect the biosphere, purification of the polluted soil or ground water is now an issue to be solved immediately in addition to the isolation of the pollution source.

Methods for remedying soil polluted with these pollutants include, for example, heat treatment of the dug-up soil, vacuum extraction of the contaminant from the polluted soil and microbial degradation of the pollutant in soil. Although the heat treatment can completely purify the soil, the soil must be dug up since soil under structures cannot otherwise be purified. Moreover, this method is unsuitable for large-scale treatment because of the immense costs of digging and heating. In addition, the organochlorine compounds heated and evaporated from the soil which cause air pollution must be recovered by adsorption to activated carbon and the like, and then the used activated carbon requires safe disposal.

On the other hand, vacuum extraction and bioremediation do not require digging up soil, therefore they are inexpensive and simple processes and can be applied to the soil under the buildings while the ground surface is occupied by the buildings. The vacuum extraction process, however, requires the same treatment of the recovered organochlorine compounds as with the heat treatment method. In Japanese Patent Application Laid-Open No. 7-185252, compact ground equipment for vacuum extraction was proposed, utilizing a fluidized bed for regeneration of activated carbon to which the abstracted gas has been adsorbed. Ground equipment is still required for the treatment.

For the bioremediation, there are two methods, one utilizes the pollutant degrading microorganisms originally living in the soil, so-called native microorganisms, and the other utilizes pollutant degrading microorganisms not originally living in the soil. By the former method, remediation is carried out by introducing into the soil activating agents such as nutrients, inducers, oxygen and growth stimulating agents to improve the degradation activity of the native microorganisms.

The examples of strains capable of degrading TCE are given as follows: *Welchia alkenophila* sero 5 (U.S. Pat. No. 4,877,736, ATCC 53570), *Welchia alkenophila* sero 33 (U.S. Pat. No. 4,877,736, ATCC 53571), Methylocystis sp. strain M (Agric. Biol. Chem., 53, 2903 (1989), Biosci. Biotech. Biochem., 56, 486 (1992), ibid. 56, 736 (1992)), *Methylosinus trichosporium* OB3b (Am. Chem. Soc. Natl. Meet. Dev. Environ. Microbiol., 29, 365 (1989), Appl. Environ. Microbiol., 55, 3155 (1989), Appl. Biochem. Biotechnol., 28, 877 (1991), Japanese Patent Application Laid-Open No. (JPUPA) 02-92274, JPUPA 03-292970), Methylomonas sp. MM2 (Appl. Environ. Microbiol., 57, 236 (1991)), *Alcaligenes denitrificans* ssp. xylosoxidans JE75 (Arch. microbiol., 154, 410 (1990)), *Alcaligenes eutrophus* JMP134 (Appl. Environ. Microbiol., 56, 1179 (1990)), *Mycobacterium vaccae* JOB5 (J. Gen. Microbiol., 82, 163 (1974), Appl. Environ. Microbiol., 54, 2960 (1989), ATCC 29678), *Pseudomonas putida* BH (Journal of Japan Sewage Work Assosiation, 24, 27 (1987)), Pseudomonas sp. strain G4 (Appl. Environ. Microbiol., 52, 383 (1986), ibid. 53, 949 (1987), ibid. 54, 951 (1988), ibid. 56, 1279 (1990), ibid. 57, 1935 (1991), U.S. Pat. No. 4,925,802, ATCC 53617, this strain was originally classified as *Pseudomonas cepacia* then classified into Pseudomonas sp.), *Pseudomonas mendocina* KR-1 (Bio/Technol., 7, 282 (1989)), *Pseudomonas putida* F1 (Appl. Environ. Microbiol., 54, 1703 (1988), ibid. 54, 2578 (1988)), *Pseudomonas fluorescens* PFL12 (Appl. Environ. Microbiol., 54, 2578 (1988)), *Pseudomonas putida* KWI-9 (JPUPA 06-70753), *Pseudomonas cepacia* KKO1 (JPUPA 06-227769), Pseudomonas sp. (JPUPA 02-273599), *Nitrosomonas europaea* (Appl. Environ. Microbiol., 56, 1169 (1990)), *Lactobacillus vaginalis* sp. nov (Int. J. Syst. Bacteriol., 39, 368 (1989), ATCC 49540) and so on. All these strains, however, require a chemical substance such as aromatic compounds and methane as an inducer in order to express their TCE degrading activity.

According to the latter method, remediation is carried out by introducing foreign microorganisms into the soil together with microbial activator for enhancing degradation activity. It is economically desired that microorganisms or chemical substances in an amount as small as possible are introduced and spread into the region to be remedied to carry out the degradation of the pollutants for remediation of the soil. In this sense, the microbial treatment has a drawback since it requires the introduction of a huge amount of a treating solution to remedy a wide region, filling the pore space of the soil to be treated.

With both methods, it is difficult to confine the injected microorganisms or activating agents within a certain region and also difficult to recover the degrading bacteria once proliferated in the soil or the activating agents remaining in the soil after the treatment, causing problems of secondary contamination of the soil.

As mentioned above, the vacuum extraction process and bioremediation process have advantages over the heat treatment method, yet they still have some problems to be solved for more efficient treatment.

In Japanese Patent Application Laid-Open No. 6-254537 and No. 7-112176, it is proposed to combine the vacuum extraction process and the bioremediation process so that air and ground water in the soil contaminated with organochlorine compounds are exposed to vacuum and introduced to a bioreactor on the ground in which the pollutant is degraded. This method aims to solve the drawback of the vacuum extraction process, that is, the reprocessing of the recovered organochlorine compounds, by carrying out biodegradation of the organochlorine compounds, and to solve the drawback of the microbial process such as the injection of the treating solution and the secondary contamination by installing a microbial degradation reactor.

The above-mentioned process in which the vacuum extraction process and the microbial process are combined, still requires ground equipment including a biodegradation reactor, and in this sense, it has the same problem as that of the vacuum extraction process. Since the degradation activity of the microorganism depends on the temperature, an apparatus or equipment to keep the bioreactor at a constant temperature or to protect it from the ambient temperature is further required to assure certain decomposition efficiency. Thus, there is a problem that the scale of the ground equipment of this method becomes larger than that of the vacuum extraction alone.

In other words, large-scale equipment may increase the remediation cost, and huge ground equipment may cancel out the advantage of the vacuum extraction process and the bioremediation process over the heat treatment method, that is, the remediation can be carried out maintaining the state of the soil and the ground surface.

SUMMARY OF THE INVENTION

The present invention has been made to solve the above-mentioned problems, and to provide a process for remedying a soil contaminated with a volatile pollutant and an apparatus used therefor, which process has both merits of the vacuum extraction process and bioremediation process to treat volatile pollutants in the soil.

According to one aspect of the present invention, there is provided a remediation process for soil contaminated with a volatile pollutant, which comprises the steps of:

forming in a probe a remediation site containing a microorganism, the microorganism being capable of degrading the volatile pollutant;

introducing the volatile pollutant from the soil into the remediation site in the probe; and degrading the volatile pollutant by the microorganism.

According to still another aspect of the present invention, there is provided an in situ remediation process for a soil contaminated with a volatile pollutant, which comprises the steps of:

making a tubular probe reach the soil contaminated with the pollutant;

forming in a probe a remediation site containing a microorganism, the microorganism being capable of degrading the pollutant; and introducing the pollutant from the soil into the remediation site in the probe and degrading the pollutant by the microorganism.

According to still another aspect of the present invention, there is provided an apparatus for degrading a volatile pollutant in the soil, comprising i) a tubular probe containing a microorganism capable of degrading the pollutant therein; and ii) means for sucking the volatile pollutant.

According to still another aspect of the present invention, there is provided an apparatus for degrading a volatile pollutant in the soil, comprising i) a tubular probe containing a microorganism capable of degrading the pollutant therein, the probe being adapted to be inserted in the soil contaminated with the pollutant; and ii) means to introduce the volatile pollutant into the tubular probe.

According to still another aspect of the present invention, there is provided a tubular remediation apparatus for degrading a volatile pollutant in soil, the apparatus being able to be driven into ground with an end having an opening first, another end of the apparatus being removablly connected to gas-sucking means by which inner pressure of the apparatus can be reduced, and the apparatus being provided with an injection pipe through which a substance can be injected into the tubular apparatus.

According to still another aspect of the present invention, there is provided a system for remedying a soil contaminated with a volatile pollutant comprising:

the above-mentioned tubular remediation apparatus;

means to supply a substance to be injected into the tubular remediation apparatus through an injection pipe provided in the tubular remediation apparatus; and gas-sucking means which can be connected to an opening at an upper end of the tubular remediation apparatus to reduce the inner pressure of the tubular remediation apparatus.

According to still another aspect of the present invention, there is provided an apparatus for remedying a soil contaminated with a volatile pollutant comprising:

a remediation apparatus being able to be driven into ground with an end having an opening first, another end of the apparatus being removablly connected to gas-sucking means by which inner pressure of the apparatus can be reduced, and the apparatus being provided with an injection pipe through which an agent can be injected into the tubular apparatus;

means to supply the agent containing a microorganism being capable of degrading the pollutant into the tubular apparatus through the injection pipe provided in the tubular apparatus; and gas-sucking means which can be connected to an opening at another end of the tubular apparatus to reduce the inner pressure of the tubular apparatus.

According to the present invention, it is not necessary to provide a separate reactor on the ground and the useful space above the ground is not spoiled, that is, only an exhaust port of a tubular probe stands on the surface of the contaminated soil, and the ground is not occupied by a massive treatment apparatus. For example, a tubular probe driven under the floor of a building allows the concomitant use of the building while the treatment operation is carried out without changing the ground appearance.

The soil temperature varies, less than the atmospheric temperature, within a range between 15 and 25° C., which is the optimal temperature for the soil microbes. According to the present invention, the microbial environment of a constant temperature can be easily provided all year without using any special heating or cooling equipment, or heat insulating equipment. This means the cost for installing and running the facilities for temperature control of the reactor can be spared due to the almost constant temperature conditions in the soil.

The remediation site in a tubular probe is effectively formed by enhancing the activity of the degrading microorganism in the soil packed in the probe, by injecting into the soil in the probe one or more substances which enhance the biodegradability of the microorganism, such as nutrients, inducers, oxygen and growth stimulating agents.

By controlling the amount of the treating agent to be injected not to exceed the water holding capacity of the objective soil, the treating agent and the proliferated pollutant-degrading microorganism will not leak from the driven tubular probe, and there will be no concerns for secondary contamination. In addition, only a minimum amount of soil requires after-processing, since the soil in the tubular probe can be removed after the treatment operation is finished.

According to the present invention, since injection of the treating agent activates not only one but also various kinds of microorganisms, complex contamination caused by two or more kinds of pollutants can be also coped with.

In the present specification, the term "soil region" means the region containing the pollutant to be degraded, and the region through which the pollutant can be introduced into the remediation apparatus by suction, for example, the vicinity of the contaminated region.

DETAILED DESCRIPTION OF THE PREFERRED EMBODIMENTS

Figure 1:
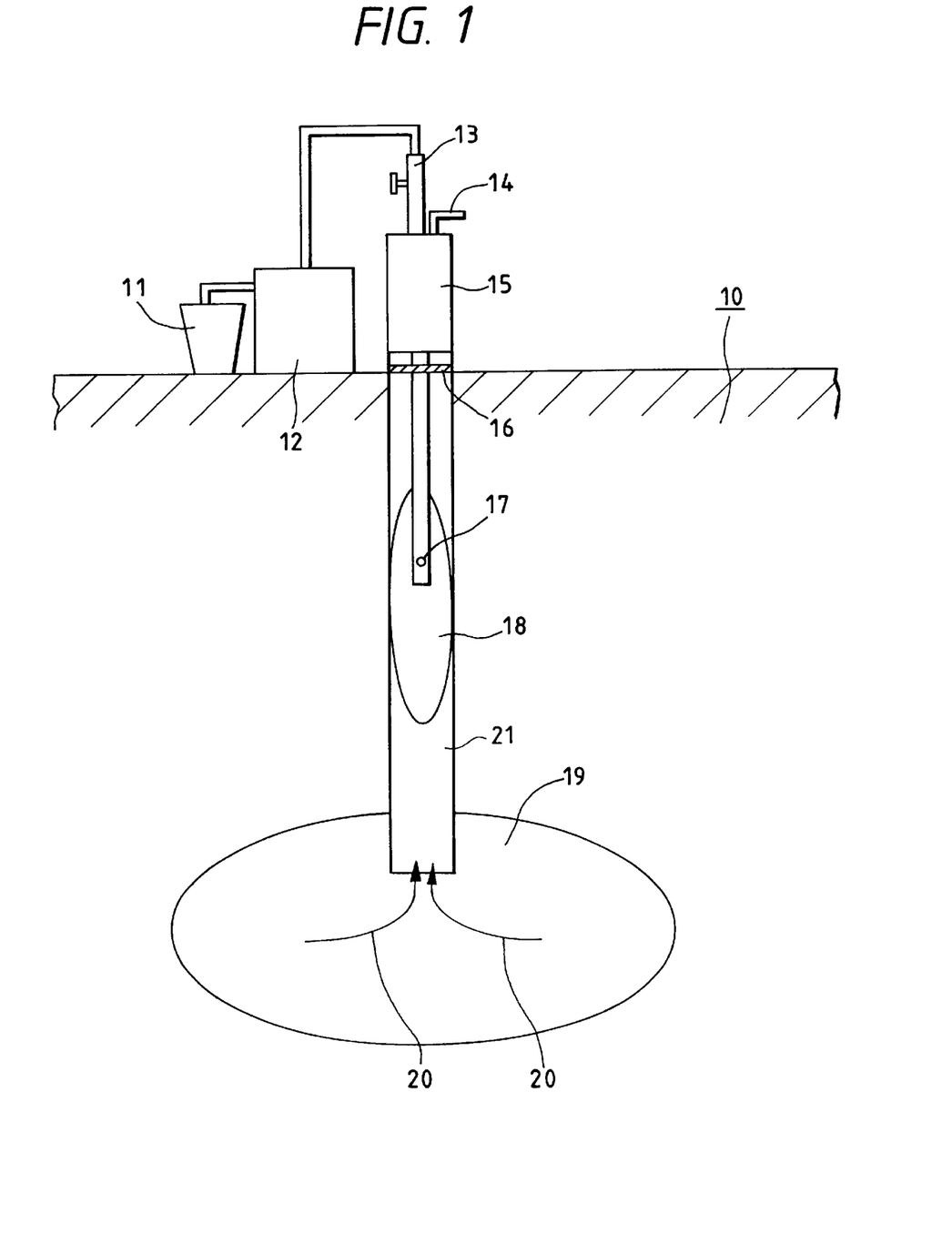
FIG. 1 is a schematic view of the construction of the ground equipment and underground apparatus of the experimental tank used in Example 2.

Referring to FIG. 1, the soil remediation process will be explained. In FIG. 1, soil 10 contains soil region 19 containing a volatile pollutant. A hollow, tubular and open-ended probe 21 is so constructed that it can reach the soil region 19. Within the probe 21, soil is packed by driving the probe into the soil. The soil packed in the probe contains a microorganism which can degrade the volatile pollutant, thereby forming remediation site 18 for the volatile pollutant.

Here, the microorganism can be those which are not originally present in the soil, or those which are native to the soil region. In the case where a microorganism which is not present originally in the soil region is used, the remediation site 18 can be formed by injecting the microorganisms through, for example, a Manchette tube 13 having opening 17, into the packed soil in the probe 21. In the case where the pollutant-degrading microorganism lives in the soil 10, the remediation site 18 is formed by driving the probe into the soil 10. Illustrative examples of the microorganisms which can degrade volatile pollutants include various microorganisms capable of degrading organochlorine compound, as recited in the Related Art. In particular, strain J1 and strain JM1 which were isolated from soil and have high applicability to soil, are preferable for the present invention.

Strain J1 and strain JM1 have been deposited in the National Institute of Bioscience and Human-Technology, Agency of Industrial Science and Technology, Ministry of International Trade and Industry (1-3, 1-chome, Azuma, Tsukuba-shi, Ibaraki-ken, Japan) as international deposit under the Treaty of Budapest. Their deposit numbers and deposit dates are as follows;

1) Strain J1: FERM BP-5102; deposit date: May 25, 1994 (relegated from FERM P-14332 to international deposit on May 17, 1995).
2) Strain JM1: FERM BP-5352: deposit date: Jan. 10, 1995 (relegated from FERM P-14727 to international deposit on Dec. 22, 1995).

Strain JM1 is a mutant derived from strain J1 which oxidizes an aromatic compound and an organochlorine compound by oxygenase, mutagenized to constitutively express oxygenase without any inducer. The bacteriological properties of J1 and JM1 are as follows.

Gram staining and morphology: gram-negative rod
Growth on growth media
   BHIA: good
   MacConkey: possible
Color of colony: cream
Optimal temperature: 25° C.>30° C.>35° C.
Motility: negative (semisolid medium)
TSI (slant/butt): alkali/alkali, $H_2S$ (−)
Oxidase: positive (weak)
Catalase: positive
Fermentation of sugar
   glucose: negative
   sucrose: negative
   raffinose: negative
   galactose: negative
   maltose: negative
urease: positive
esculin hydrolysis (β-glucosidase): positive
nitric acid reduction: negative
indole production: negative
glucose acidification: negative
arginine dehydrolase: negative
gelatin hydrolysis (protease): negative
β-galactosidase: negative
Assimilation of compounds:
   glucose: negative
   L-arabinose: negative
   D-mannose: negative
   D-mannitol: negative
   N-acetyl-D-glucosamine: negative
   maltose: negative
   potassium gluconate: negative
   n-capric acid: positive
   adipic acid: negative
   dl-malic acid: positive
   sodium citrate: positive
   phenyl acetate: negative Whether a native or non-native microorganism is used, it is preferable to inject at least a liquid or a gas which can activate the microorganism through Manchette tube 13 into the remediation site 18, in order to accelerate the degradation of the pollutant.

An example of the liquid which can activate the microorganism is a treating agent containing an inducer which induces the expression of pollutant-degradation activity in the microorganism, a nutrient for microbial growth and a growth stimulating agent which stimulates the growth of microorganism. More specifically, for example, when strain J1 (BP-5102) is used, the inducer can be aromatic compounds such as phenol and toluene, the nutrient can be citric acid, and the growth stimulating agent can be fine particles of bentonite and the like.

Examples of a gas which can activate the microorganism include oxygen and a gas containing the above-mentioned inducer, nutrient and growth stimulating agent.

After the remediation site is formed in the probe, a valve of the Manchette tube 13 is closed to cut the air flow from the above ground to the probe, a vacuum pump 15 is attached to the upper end of the probe to exhaust the air in the soil so that the volatile pollutant contained in the soil region 19 is introduced to the remediation site in the probe.

Here, the speed of the air flow through the probe is determined by the suction power of the vacuum pump and the porosity rate of the soil. The porosity rate depends on the degree of consolidation and the water content of the soil. If the soil is an average sandy soil having a wet consolidation degree of 1.9 g/cm$^3$ and a water content of 15%, the moving speed of the air can be 10 cm/min when a powerful pump is used. It is preferable, however, to control the amount of the air aspirated by the pump so that the pollutant concentration in the exhaust is always below a certain standard level. If the contact time between the pollutant and the microorganism is too short, a part of the pollutant fails to be degraded and remains in the exhaust released from an exhaust tube 14. The degrading activity of the pollutant-degrading microorganism may be low for several days after the suction is started. In such a case, the suction amount of the air by the pump is preferably diminished to control the pollutant concentration in the exhaust air below the standard level.

When the degradation capacity is lowered below a certain level, the treating agent containing a necessary nutrient and the like can be re-injected through the Manchette tube, and after the degradative activity of the microorganism is raised, the suction can be carried out again.

When there is a possibility of the secondary contamination problem such as exudation of the pollutant-degradative microorganism, the inducer etc. from the probe due to the infiltrating rain after the remediation process carried out in this manner, the tubular probe together with the soil inside can be removed from the soil 10 and the soil in the probe can be treated. If there is no concern about the secondary contamination, only the vacuum pump at the top of the probe is removed and the probe may be left in the soil 10.

As explained above, the present invention allows very efficient degradation of the volatile pollutant to remedy the soil, without causing secondary contamination due to the remediation process.

The present invention will be further illustrated with the following examples but those examples are not to be construed to limit the present invention.

EXAMPLE 1

Figure 2:
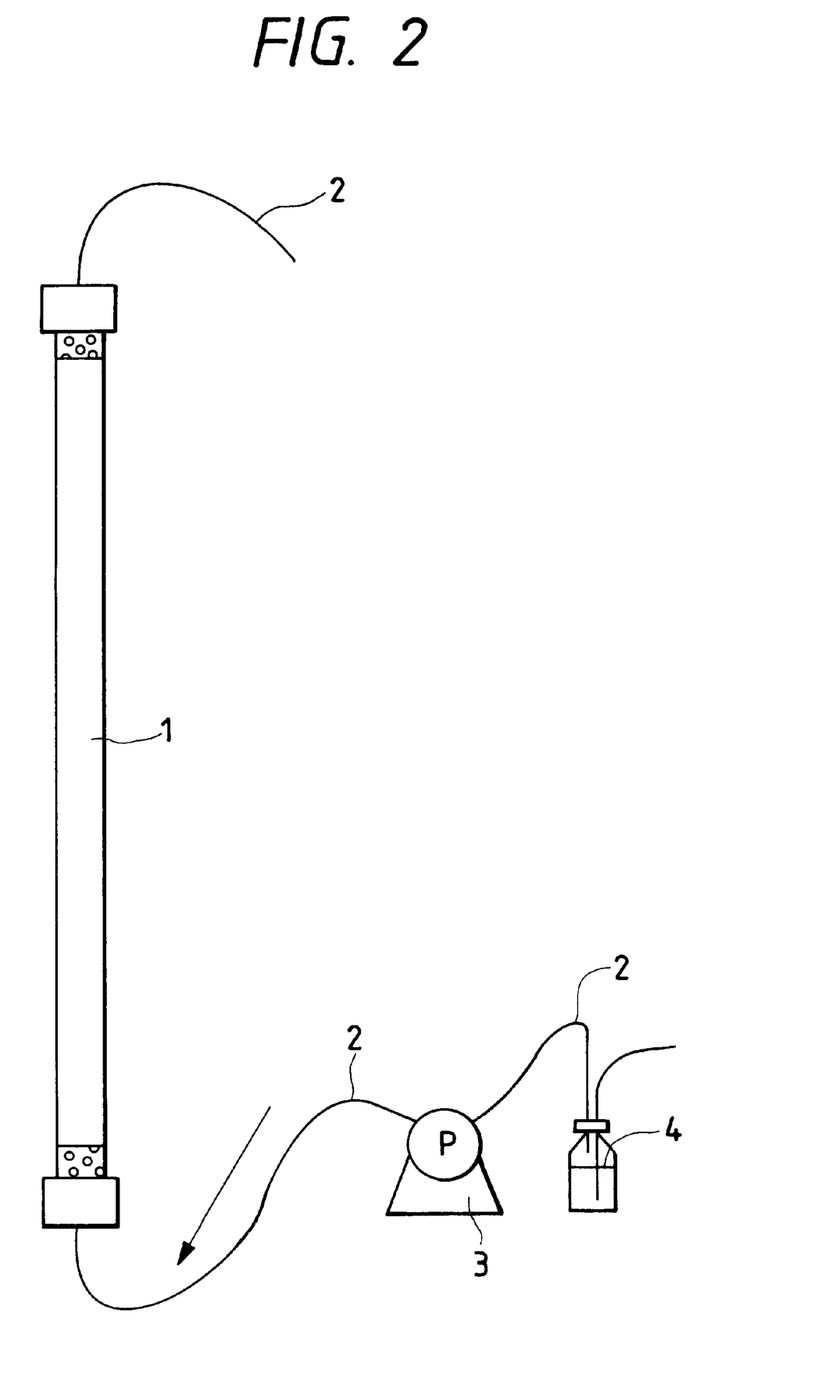
FIG. 2 is an elevational view illustrating the procedure using the column of Example 1.

As shown in FIG. 2, a glass columns 1 having an inner diameter of 30 mm, a length of 1000 mm and threaded ends was prepared, as well as three screw caps for them. For each of two screw caps, a Teflon coated rubber gasket was provided inside, a pin-hole was provided at the center of the cap and the gasket, and silicone tube 2 having a diameter of 0.7 mm was passed through the hole. The remaining one cap was used as a temporary cap.

As the soil to be packed in the column 1, fine sand containing 11.2% of clay was used. The initial bacterial number of the soil counted using 2×YT agar medium was 4.5×10$^4$ cells/g (based on dry soil). The composition of 2× YT medium was as follows:

| | |
|---|---|
| Polypeptone | 16 g/l |
| Yeast extract | 10 g/l |
| NaCl | 5 g/l. |

To about 1500 g of this soil, was added 200 ml of a degradative microorganism in a nutrient solution shown as below and mixed well. The final water content of the soil was 16.3%.

Nutrient solution composition for degrading bacteria:
Minimal medium of double concentration (2× M9)

| | |
|---|---|
| Na$_2$HPO$_4$ | 12.4 g/l |
| KH$_2$PO$_4$ | 6.0 g/l |
| NaCl | 1.0 g/l |
| NH$_4$Cl | 2.0 g/l |
| Sodium citrate | 10.0 g/l |
| Phenol | 0.3 g/l |

Dispersion of the degradative bacterium (strain J1): final concentration 2×10$^9$ cells/l The soil was packed into the column as follows: gravel of about 5 to 10 mm diameter was put in the column to 100 mm high from the lower end which was closed with a temporary cap, then 1280 g of the above-mentioned wet soil was compacted to 800 mm high from the top surface of the gravel layer, and the column was again packed with gravel to the top end and closed with a cap having a Teflon tube 2 passing through it. Then the temporary cap at the lower end of the column was replaced with the cap having the Teflon tube passing through it. The wet consolidation degree of the soil was 1.6 g/cm$^3$. The prepared column was fixed upright on a tripod and connected to a pump 3 (Roller Pump RP-MRF1, a product of FURUE SCIENCE Co., Ltd.). In order to avoid the contamination of external microorganisms and drying of the soil, a tank 4 containing clean water was connected to an air inlet. A schematic illustration showing the construction of the apparatus given in FIG. 2. The apparatus was allowed to stand under this condition at room temperature for 48 hours while air was sent at 2 ml/min (period for growing degradative bacteria).

Then a reservoir 5 comprising a 27 ml vial containing 15 ml of 1000 ppm trichloroethylene aqueous solution, and an empty 1000 ml glass bottle 6 for replenishing oxygen, were provided and each of them was closed with a cap having a Teflon coat rubber gasket, which was provided with two pin holes through which two Teflon tubes 2 were passed through.

Figure 3:
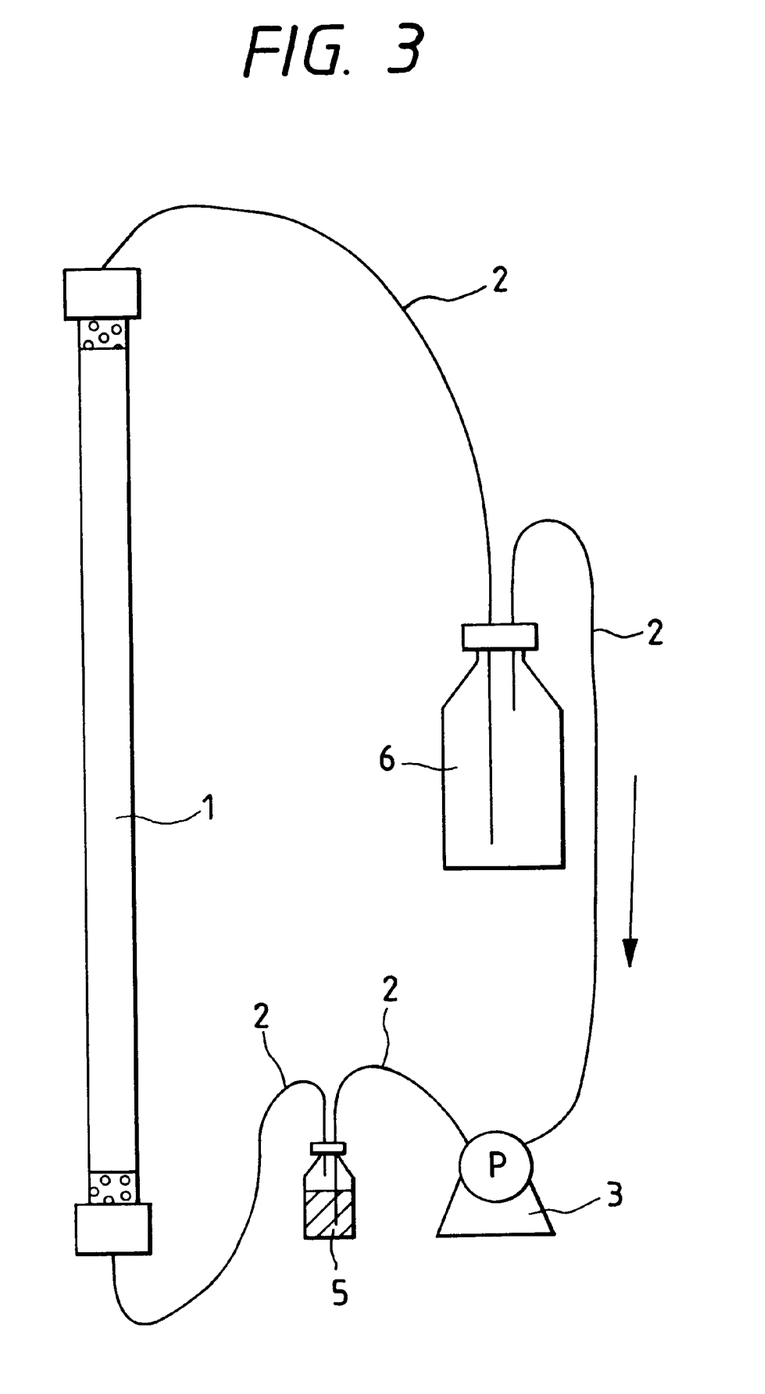
FIG. 3 is an elevational view illustrating the procedure using the column of Example 1.
Figure 4:
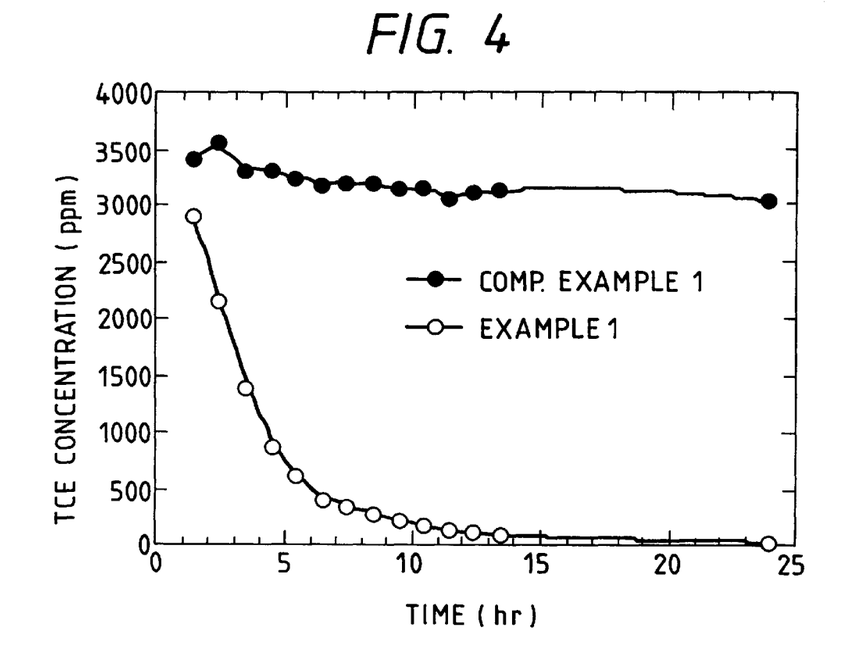
FIG. 4 is a graph showing the change of TCE concentration in the gas phase of the column with time in Example 1 and Comparative Example 1.

The TCE reservoir 5, the empty bottle 6 and the pump 3 were connected to the above-mentioned column which had been allowed to stand for 48 hours as shown in FIG. 3, and air containing TCE vapor was sent to the column 1 at 30 ml/min for 24 hours. The air in the TCE reservoir tank was first sampled 30 minutes after the sending of the air containing TCE vapor was started, and then sampled every 60 minutes, and the TCE concentration was measured by gas chromatography. TCE gradually decreased from the beginning of the measurement and the gas phase concentration reached 1 ppm or less within about 24 hours. The result of the measurement of the gas phase TCE concentration is shown in FIG. 4. After the TCE degradation experiment was over, the number of the bacteria in the column was counted using 2× YT agar medium, and it was 2.3×10$^8$ cells/g (based on dry soil).

COMPARATIVE EXAMPLE 1

A packed column was prepared as in Example 1 except that sterilized water was added to the soil instead of the degradative microorganism in a nutrient solution used Example 1 to adjust the water content to 16.3%.

The column was fixed upright on a tripod and air was sent at 2 ml/min for 48 hours at room temperature, then a TCE reservoir 5 and an empty bottle 6 were connected thereto as shown in FIG. 3 and TCE degradation experiment was carried out for 24 hours. The measurement of TCE was carried out in the same manner as in Example 1. TCE concentration was reduced only slightly. The results are shown in FIG. 4. The number of the bacteria in the column after the TCE degradation was counted using 2x YT agar medium and it was $4.6 \times 10^4$ cells/g (based on dry soil).

EXAMPLE 2

Figure 5:
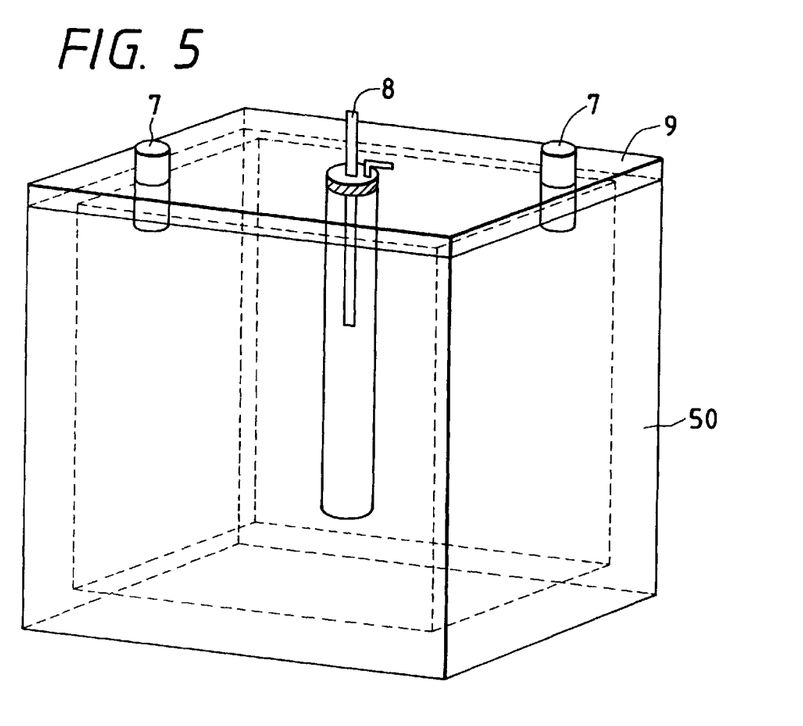
FIG. 5 is a schematic view of the construction of the experimental tank used in Example 2.

An experimental artificial soil was prepared in an experimental tank (inside dimensions: 3 m×3 m×3 m, inner surface lined with a vinyl ester resin) as shown in FIG. 5.

The preparation process will be illustrated as follows. Firstly, a layer of gravel (average size of 3 cm) was laid on the bottom of the experimental tank 50 in a thickness of about 30 cm. Then four compressed fine sand layers (average wet consolidation degree of 1.8 g/cm$^3$) were prepared (average water content of 13%) in a thickness of about 60 cm each. Then on the top of them, a gravel layer of about 30 cm thickness was prepared in a similar way as the down-most layer to provide an experimental artificial soil. During the preparation of this artificial soil, a stainless pipe having an inner diameter of 50 mm reaching the lower gravel layer was installed (not shown in the figure).

Then, a stainless tubular probe having an inner diameter of 200 mm, a length of 3 m was installed into the above-mentioned artificial soil (driven from the upper surface of the artificial soil to the point 2.4 m below the surface), and a Manchette tube for injection of a solution was installed inside of the probe. The Manchette tube used in this example was a ¾ inch iron tube, having one outlet port in vertical direction which was protected with a rubber sleeve. Packers and the like were not used and the solution was directly introduced into the Manchette tube under pressure.

After installing the remediation probe and the Manchette tube, the experimental tank was closed with a concrete lid, then completely sealed by coating a urethane resin thereon.

As air inlets, two stainless pipes 7 of inner diameter of 50 mm were installed to the lid, where the pipes 7 reached the upper gravel layer and a valve was installed at the upper end of each pipe to control the air flow rate by closing/opening the valve.

Then the ground equipment shown in FIG. 1 was installed and 20 l of a nutrient solution containing degradative bacteria was introduced under pressure using the injection pump after the completion of all preparation. The solution composition was as follows:

Minimal medium of double concentration (2x M9)

| | |
|---|---|
| Na$_2$HPO$_4$ | 12.4 g/l |
| KH$_2$PO$_4$ | 6.0 g/l |
| NaCl | 1.0 g/l |
| NH$_4$Cl | 2.0 g/l |
| Sodium citrate | 10.0 g/l |
| Phenol | 0.3 g/l. |

Dispersion of the degradative bacterium (strain J1): final concentration: $3.2 \times 10^9$ cells/l After standing for 24 hours (soil temperature 16° C.), 30 l of 700 ppm trichloroethylene aqueous solution as a pollutant was injected into the lower gravel layer of the experimental soil using the stainless pipe provided during the preparation of the soil (not shown in the figure).

Figure 6:
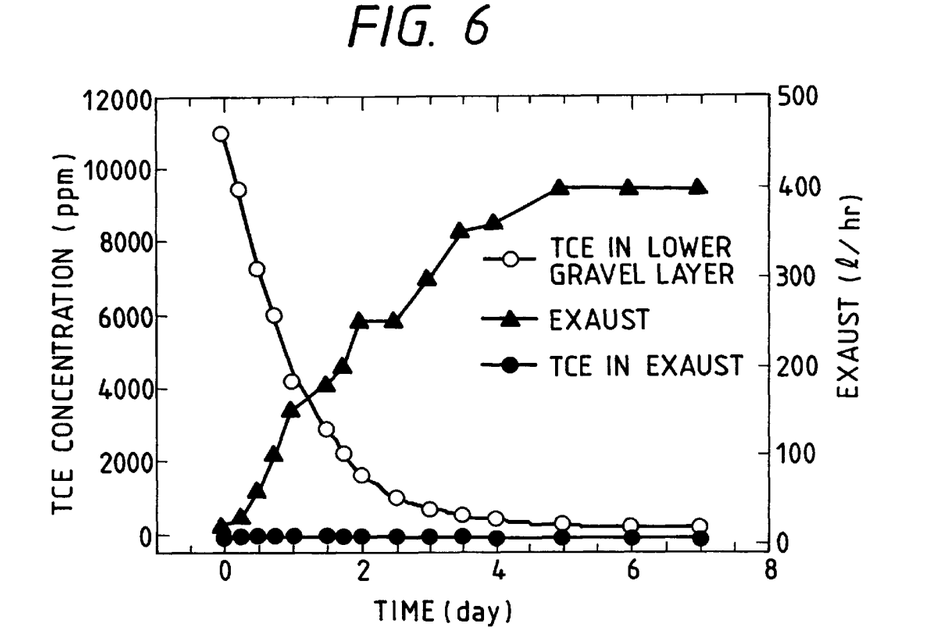
FIG. 6 is a graph showing the change of TCE concentration in Example 2.

After the standing of 5 hours, the vacuum pump 15 connected to the upper end of the probe (exhaust port) was started (air inlets 7 were opened and the Manchette tube for solution injection was closed), and the TCE concentrations in the air exhaust from the pump and in the air of the lower gravel layer of the experimental tank, as well as the quantity of the exhaust from the pump, were determined and recorded regularly. The results of the measurement are shown in FIG. 6. The measurement of the TCE concentration was carried out using a detector tube.

The quantity of the exhaust from the pump was controlled such that the TCE concentration in the exhaust air did not exceed 1 ppm.

After the experiment was over, the remediation apparatus was removed from the experimental tank and the soil near the bottom end of the remediation apparatus was sampled. The total bacterial number in the sampled soil measured by dilution plate count using 2x YT agar medium was $2.1 \times 10^5$ cells/g (based on dry soil) and neither the degradative bacterium strain J1 introduced into the remediation apparatus nor phenol or sodium citrate were detected. Therefore, it was confirmed that no secondary contamination of the environment was caused by the remediation process. On the other hand, the bacterial count of the soil in the removed remediation apparatus where the injected solution had reached was $7.7 \times 10^8$ cells/g (based on dry soil) and 80% or more of them were strain J1. Thus, the proliferation of strain J1 in the probe was confirmed. The 2x YT agar medium composition was as follows:

| | |
|---|---|
| Polypeptone | 16.0 g/l |
| Yeast extract | 10.0 g/l |
| NaCl | 5.0 g/l |
| Agarose | 11.0 g/l. |

This Example clearly shows that degradation of the pollutant can be efficiently carried out without causing secondary contamination according to the present invention.

COMPARATIVE EXAMPLE 2

An experimental tank with a remediation apparatus and the ground equipment was prepared in the same manner as in Example 2, except that 20 l of tap water was injected instead of the nutrient solution. The tank was left for 24 hours (soil temperature 16° C.), and then 30 l of 700 ppm trichloroethylene aqueous solution was injected as a pollutant into the lower gravel layer of the experimental soil through a stainless pipe installed when the soil was prepared.

Figure 7:
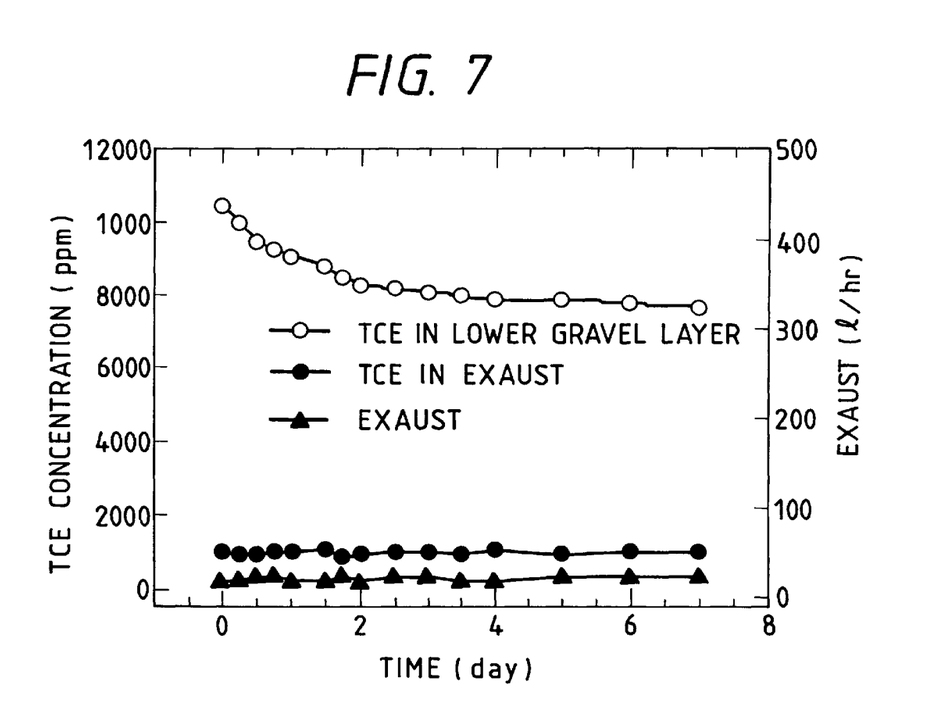
FIG. 7 is a graph showing the change of TCE concentration in Comparative Example 2.

After standing for 5 hours, the vacuum pump was started (air inlets were opened and the Manchette tube for solution injection was closed), and the TCE concentrations in the air exhaust from the pump and in the air of the lower gravel layer of the experimental tank, as well as the quantity of the exhaust from the pump, were determined and recorded regularly. The results of the measurement are shown in FIG. 7. The measurement of the TCE concentration was carried out using a detector tube as in Example 2.

The quantity of the exhaust from the pump was controlled such that the TCE concentration in the exhaust air did not exceed 1000 ppm. The exhaust air was finally passed through an activated charcoal tank and the TCE concentration in the air was made not to exceed 1 ppm.

As FIG. 7 shows, the native soil bacteria in the probe hardly have TCE degradation ability, and when the air was sucked using a vacuum pump from the upper end of the probe, the TCE concentration in the exhaust air easily exceeded 1000 ppm, accordingly, the amount of the exhaust air could not be increased.

After the experiment, the remediation apparatus was removed from the experimental tank and the soil near the bottom of the apparatus was sampled. The number of the bacteria in the sampled soil counted by dilution plate technique in a manner similar to that used in Example 2, was $2.7 \times 10^5$ cells/g (based on dry soil). The number of the bacteria in the soil in the removed remediation apparatus wherein the injected solution had reached was counted and it was $2.6 \times 10^5$ cells/g (based on dry soil).

EXAMPLE 3

A packed glass column was prepared in the same manner as in Example 1, except that the degradative bacterium was strain JM1 and phenol (an inducer) was not included in the feeding solution. The column was fixed upright on a tripod as in Example 1 and air was sent at 2 ml/min for 48 hours at room temperature. Then a TCE reservoir was connected to send TCE to the column to carry out TCE degradation experiment for 24 hours. TCE measurement was carried out in the same manner as in Example 1. The TCE concentration in the gas exhaust was always below the detection limit.

EXAMPLE 4

One glass columns 1 having an inner diameter of 30 mm, a length of 1000 mm and threaded ends was provided and three screw caps were prepared. For each of two screw caps, a Teflon coated rubber gasket was provided inside, a pinhole was provided at the center of the cap and the gasket, and silicone tube 2 having a diameter of 0.7 mm was passed through the hole. The remaining one cap was used as a temporary cap.

As the soil to pack the column, fine sand containing 11.2% of clay was used. This soil was collected in Toride, Ibaraki prefecture Japan and was containing a TCE and phenol degrading native bacterium. The initial bacterial number of the soil counted using 2 x YT agar medium was $2.2 \times 10^4$ cells/g (based on dry soil). The bacterial count on a selection medium (2x M9 with 100 ppm phenol) was $1.3 \times 10^4$ cells/g (based on dry soil).

Composition of 2x YT medium:

| | |
|---|---|
| Polypeptone | 16 g/l |
| Yeast extract | 10 g/l |
| NaCl | 5 g/l |

Composition of 2x M9 medium

| | |
|---|---|
| $Na_2HPO_4$ | 12.4 g/l |
| $KH_2PO_4$ | 6.0 g/l |
| NaCl | 1.0 g/l |
| $NH_4Cl$ | 2.0 g/l |

To about 1110 g of this soil, there was added 50 ml of a nutrient solution (2x M9 containing sodium citrate (10.0 g/l) and phenol (0.3 g/l)). The final water content of the soil was 16.3%.

The soil was packed into the column as follows; gravel of about 5 to 10 mm diameter was put in the column to 100 mm high from the lower end which was closed with a temporary cap, then 1280 g of the above-mentioned wet soil was compacted to 800 mm high from the top surface of the gravel layer, and the column was again packed with gravel to the top end and closed with a cap having a Teflon tube 2 passing through it. Then the temporary cap at the lower end of the column was replaced with the cap having the Teflon tube passing through it. The wet consolidation degree of the soil was 1.6 g/cm$^3$. The prepared column was fixed upright on a tripod and connected to a pump (Roller Pump RP-MRF1, a product of FURUE SCIENCE Co., Ltd.). In order to avoid the contamination of external microorganisms and drying of the soil, a tank containing clean water was connected to an air inlet. A schematic illustration showing the construction of the apparatus given in FIG. 2. The apparatus was allowed to stand under this condition at room temperature for 48 hours while air was sent at 2 ml/min (period for growing degradative bacteria).

Then a reservoir, a 27 ml vial containing 15 ml of 1000 ppm trichloroethylene aqueous solution, and an empty 1000 ml glass bottle for replenishing oxygen were provided and each of them was closed with a cap having a Teflon coat rubber gasket, which was provided with two pin holes through which two Teflon tubes were passed through.

Figure 8:
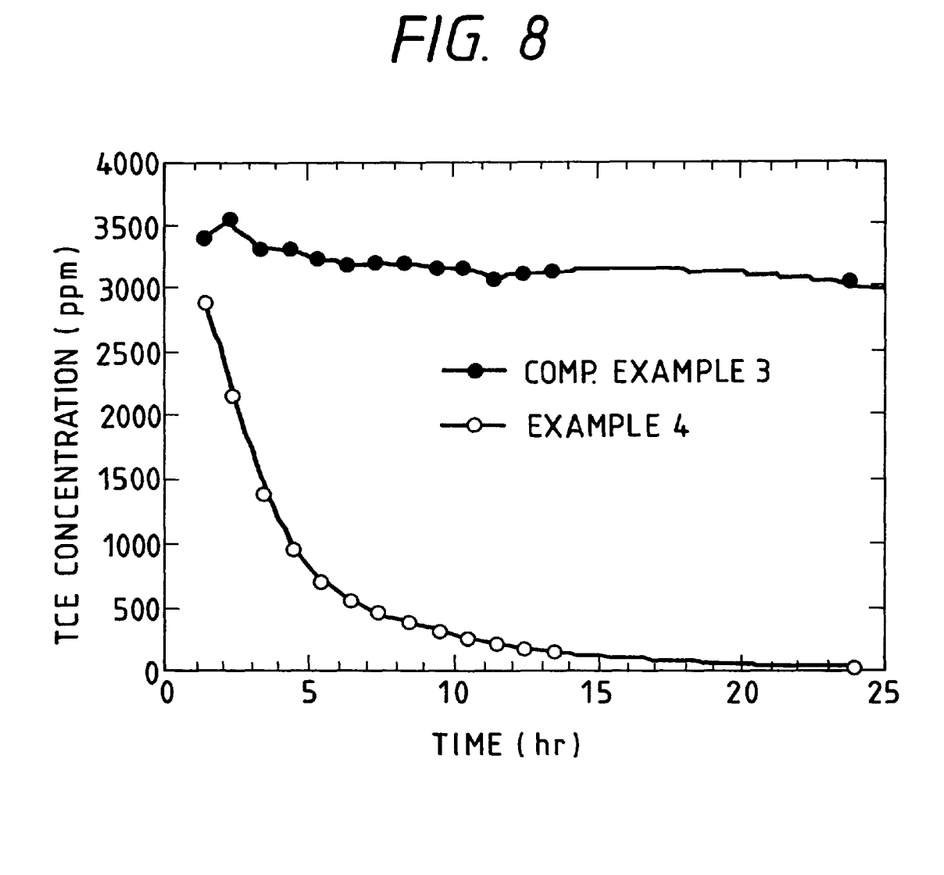
FIG. 8 is a graph showing the change of TCE concentration in the gas phase of the column with time in Example 4 and Comparative Example 3.

The TCE reservoir, the empty bottle and the pump were connected to the above-mentioned column which had been allowed to stand for 48 hours as shown in FIG. 2, and air containing TCE vapor was sent to the column at 30 ml/min for 24 hours. The air in the TCE reservoir tank was first sampled 30 minutes after the sending of the air containing TCE vapor was started, and then the air was sampled every 60 minutes, and the TCE concentration was measured by gas chromatography. TCE concentration gradually decreased from the beginning of the measurement and the gas phase concentration reached 1 ppm or less after about 24 hours. The result of the measurement of the gas phase TCE concentration is shown in FIG. 8. After the TCE degradation experiment was over, the number of the bacteria in the column was counted using 2 x YT agar medium, and it was $1.8 \times 10^8$ cells/g (based on dry soil).

COMPARATIVE EXAMPLE 3

Instead of the nutrient solution, sterilized water was added to a soil similar to that used in Example 4 and the water content was controlled to 16.3%, and the soil was packed in a glass column to show the wet consolidation degree of 1.6 g/cm$^3$ and an apparatus similar to that used in Example 4 was assembled. The column was fixed upright on a tripod and air was sent at 2 ml/min for 48 hours at room temperature, then TCE reservoir and an empty bottle were connected to the column and TCE degradation experiment was carried out for 24 hours. The measurement of TCE was carried out in the same manner as in Example 1. TCE concentration was only slightly reduced. The results are shown in FIG. 8. After the TCE degradation experiment, the number of the bacteria in the column was counted using 2x YT agar medium, and it was $4.1 \times 10^4$ cells/g (based on dry soil).

EXAMPLE 5

An experimental artificial soil was prepared in a process exactly analogous to that used in Example 2. The above ground equipment shown in FIG. 1 was installed on the experimental soil and after all the preparations for the experiment were finished, 20 l of a nutrient solution was introduced under pressure by the injection pump. The solution composition was as follows. Nutrient solution composition:

Minimal medium having double concentration (2x M9)

| | |
|---|---|
| Na$_2$HPO$_4$ | 12.4 g/l |
| KH$_2$PO$_4$ | 6.0 g/l |
| NaCl | 1.0 g/l |
| NH$_4$Cl | 2.0 g/l |
| Sodium citrate | 10.0 g/l |
| Phenol | 0.3 g/l |

After it had been allowed to stand for 24 hours (soil temperature was 16° C.), 30 l of 700 ppm trichloroethylene aqueous solution as a pollutant was injected into the lower gravel layer of the experimental soil using the stainless pipe provided during the preparation of the soil.

Figure 9:
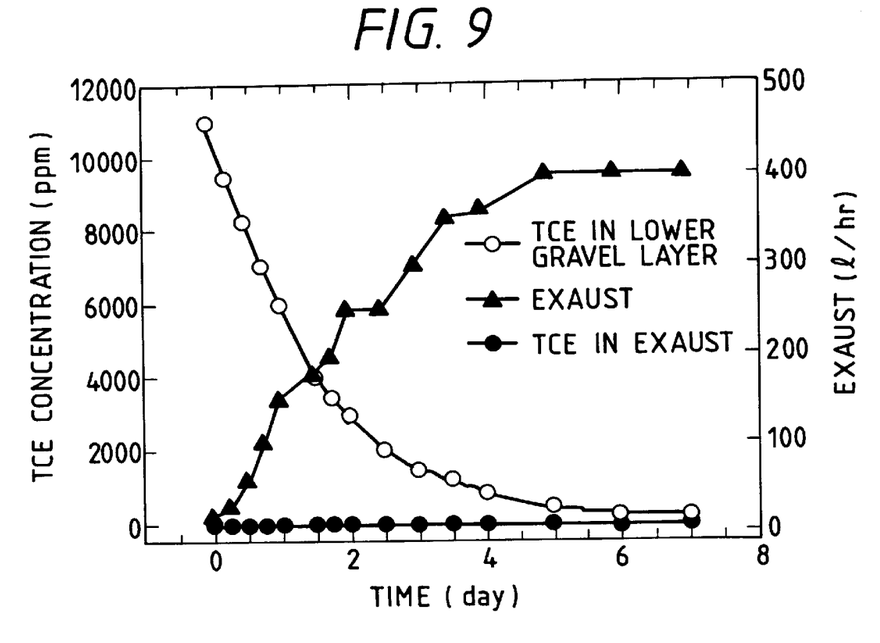
FIG. 9 is a graph showing the change of TCE concentration in Example 5.

After it had been allowed to stand for 5 hours, the vacuum pump was started (air inlets were liberated and the solution injecting Manchette tube was closed), and a TCE concentration in air from the remediation apparatus upper exhaust port and a TCE concentration in air in the lower gravel layer of the experimental tank, and the amount of the exhaust air from the exhaust port at the top of the remediation apparatus were recorded regularly. The results of the measurement are shown in FIG. 9. The measurement of the TCE concentration was carried out using a detector tube.

The amount of the exhaust air from the pump was controlled by the TCE concentration in the exhaust air such that the TCE concentration in the exhaust air did not exceed 1 ppm.

After the experiment was over, the tubular remediation apparatus was removed from the experimental tank and the soil near the bottom of the tubular remediation apparatus was sampled. As a result of the analysis of the collected soil, phenol and sodium citrate and the like were not detected to confirm that there was no secondary contamination caused in the environment by the remedying process.

The number of the bacteria in the collected soil was determined by dilution plate count using 2x YT agar medium and it was 2.3×10$^5$ cells/g (based on dry soil). The number of the bacteria in the soil within the removed remediation apparatus wherein the injected solution had reached was similarly counted and it was 8.7×10$^8$ cells/g (based on dry soil). The 2x YT agar medium composition was as follows:

| | |
|---|---|
| Polypeptone | 16.0 g/l |
| Yeast extract | 10.0 g/l |
| NaCl | 5.0 g/l |
| Agarose | 11.0 g/l |

As described above, the present Example showed that degradation of the pollutant can be efficiently carried out without causing secondary contamination according to the present invention.

COMPARATIVE EXAMPLE 4

An experimental tank similar to that used in Example 5 was provided and a remediation apparatus and above ground equipment were prepared. Then 20 l of tap water was injected instead of the nutrient solution. It was allowed to stand for 24 hours (soil temperature was 16° C.), then 30 l of 700 ppm trichloroethylene aqueous solution was injected as a pollutant into the lower gravel layer of the experimental soil using a stainless pipe installed when the soil was prepared.

Figure 10:
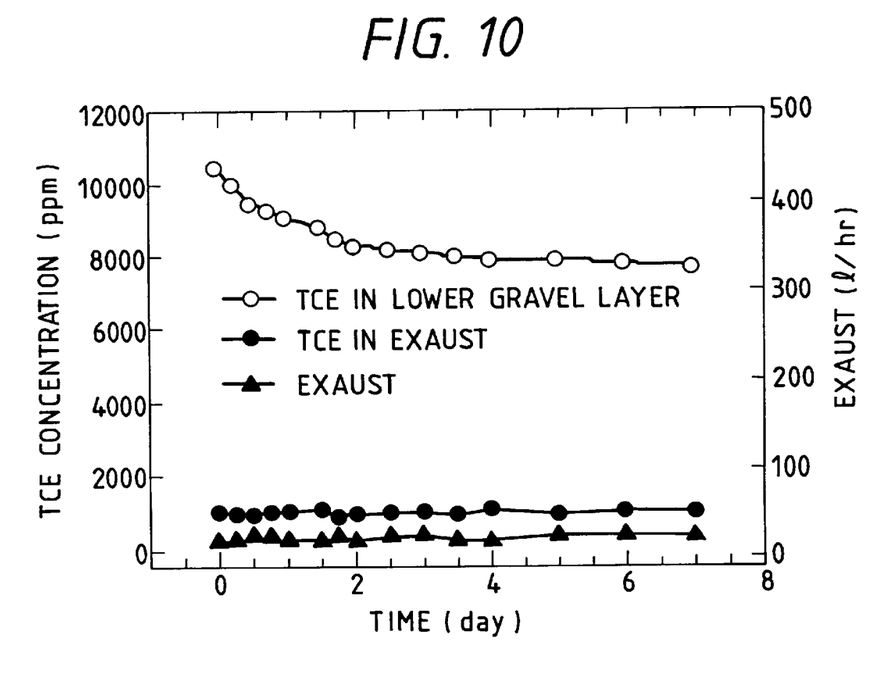
FIG. 10 is a graph showing the change of TCE concentration in Comparative Example 4.

After it was left standing for 5 hours, the vacuum pump was started (air inlets were opened and the Manchette tube for solution injection was closed), and the TCE concentrations in the air exhaust from the pump and in the air of the lower gravel layer of the experimental tank, as well as the quantity of the exhaust from the pump, were determined and recorded regularly. The results of the measurement are shown in FIG. 10. The measurement of the TCE concentration was carried out using a detector tube as in Example 5.

The quantity of the exhaust from the pump was controlled such that the TCE concentration in the exhaust air did not exceed 1000 ppm. The exhaust air was finally passed through an activated charcoal tank and the TCE concentration in the air was made not to exceed 1 ppm. The results of the measurement are shown in FIG. 10. The measurement of the TCE concentration was carried out using a detector tube as in Example 5.

After the experiment, the apparatus was removed from the experimental tank and the soil near the bottom of the apparatus was sampled. The number of the bacteria in the sampled soil determined by dilution plate count as in Example 5, was 2.5×10$^5$ cells/g (based on dry soil). The number of the bacteria in the soil within the removed remediation apparatus wherein the injected solution reached was similarly counted and it was 2.7×10$^5$ cells/g (based on dry soil).

What is claimed is:

1. A process for remediation of a subsurface soil area contaminated with a volatile pollutant, comprising the steps of:
    (a) providing a hollow tubular probe at a site such that one end of the probe reaches the contaminated subsurface soil area and a hollow space of the probe is filled with soil from the site;
    (b) forming a remediation site containing a microorganism in the hollow space of the probe, the microorganism being capable of degrading the volatile pollutant;
    (c) introducing the volatile pollutant to the remediation site in the probe from the soil; and
    (d) degrading the volatile pollutant with the microorganism in the probe.

2. The process according to claim 1, wherein the step (b) comprises the sub-step of introducing the microorganism into the soil filling the hollow space of the probe.

3. The process according to claim 2, wherein the step (b) further comprises the sub-step of activating the microorganism introduced into the soil filling the hollow space of the probe.

4. The process according to claim 1, wherein the microorganism is a native microorganism which is indigenous to the soil, and dwells in the soil filling the hollow space of the probe.

5. The process according to claim 1, wherein the step (b) comprises the sub-step of activating the native microorganism in the soil filling the hollow space of the probe.

6. The process according to claim 3 or 5, wherein the activating step comprises introducing a liquid or gas for microbial growth into the remediation site in the probe.

7. The process according to claim 6, wherein the liquid is selected from a group consisting of a nutrient, an inducer and a growth stimulating agent.

8. The process according to claim 6, wherein the gas is selected from a group consisting of oxygen, an inducer and a growth stimulating agent.

9. The process according to claim 1, wherein the step (c) is conducted by aspirating the volatile pollutant from the subsurface soil area.

10. The process according to claim 1, wherein the pollutant includes a hydrocarbon.

11. The process according to claim 10, wherein the hydrocarbon includes at least one of a chlorinated aliphatic compound and an aromatic compound.

12. The process according to claim 11, wherein the chlorinated aliphatic compound is at least one of trichloroethylene and tetrachloroethylene.

13. The process according to claim 1, wherein the probe contains a Manchette tube.

14. An apparatus for remediation of a subsurface soil area contaminated with a volatile pollutant comprising:

(a) a hollow tube, one of whose ends is open;
(b) means for injecting at least one of a microorganism capable of degrading the volatile pollutant and a nutrient for a microorganism capable of degrading the volatile pollutant to the interior of the hollow tube; and
(c) gas-aspirating means which can be connected to an opening at another end of the hollow tube to reduce the inner pressure of the hollow tube.

* * * * *

UNITED STATES PATENT AND TRADEMARK OFFICE
CERTIFICATE OF CORRECTION

PATENT NO.   : 5,906,932

DATED        : May 25, 1999

INVENTOR(S)  : AKIRA KURIYAMA

It is certified that error appears in the above-identified patent and that said Letters Patent is hereby corrected as shown below:

Figure. 6

Sheet 5, "EXAUST" (all occurrences) should read --EXHAUST--.

Figure. 7

Sheet 5, "EXAUST" (all occurrences) should read --EXHAUST--.

Figure. 9

Sheet 7, "EXAUST" (all occurrences) should read --EXHAUST--.

Figure. 10

Sheet 7, "EXAUST" (all occurrences) should read --EXHAUST--.

COLUMN 4

Line 66, "concerns" should read --concern--.

COLUMN 5

Line 53, "microorganism" should read --microorganisms--.

UNITED STATES PATENT AND TRADEMARK OFFICE
CERTIFICATE OF CORRECTION

PATENT NO. : 5,906,932

DATED : May 25, 1999

INVENTOR(S) : AKIRA KURIYAMA

It is certified that error appears in the above-identified patent and that said Letters Patent is hereby corrected as shown below:

<u>COLUMN 7</u>

Line 54, "columns" should read --column--.

<u>COLUMN 11</u>

Line 31, "columns" should read --column--.

Signed and Sealed this

Fifteenth Day of February, 2000

*Attest:*

Q. TODD DICKINSON

*Attesting Officer*     *Commissioner of Patents and Trademarks*